(No Model.)
J. E. WENGER.
MECHANICAL FLOWER FOR ADVERTISING PURPOSES.
No. 549,039. Patented Oct. 29, 1895.
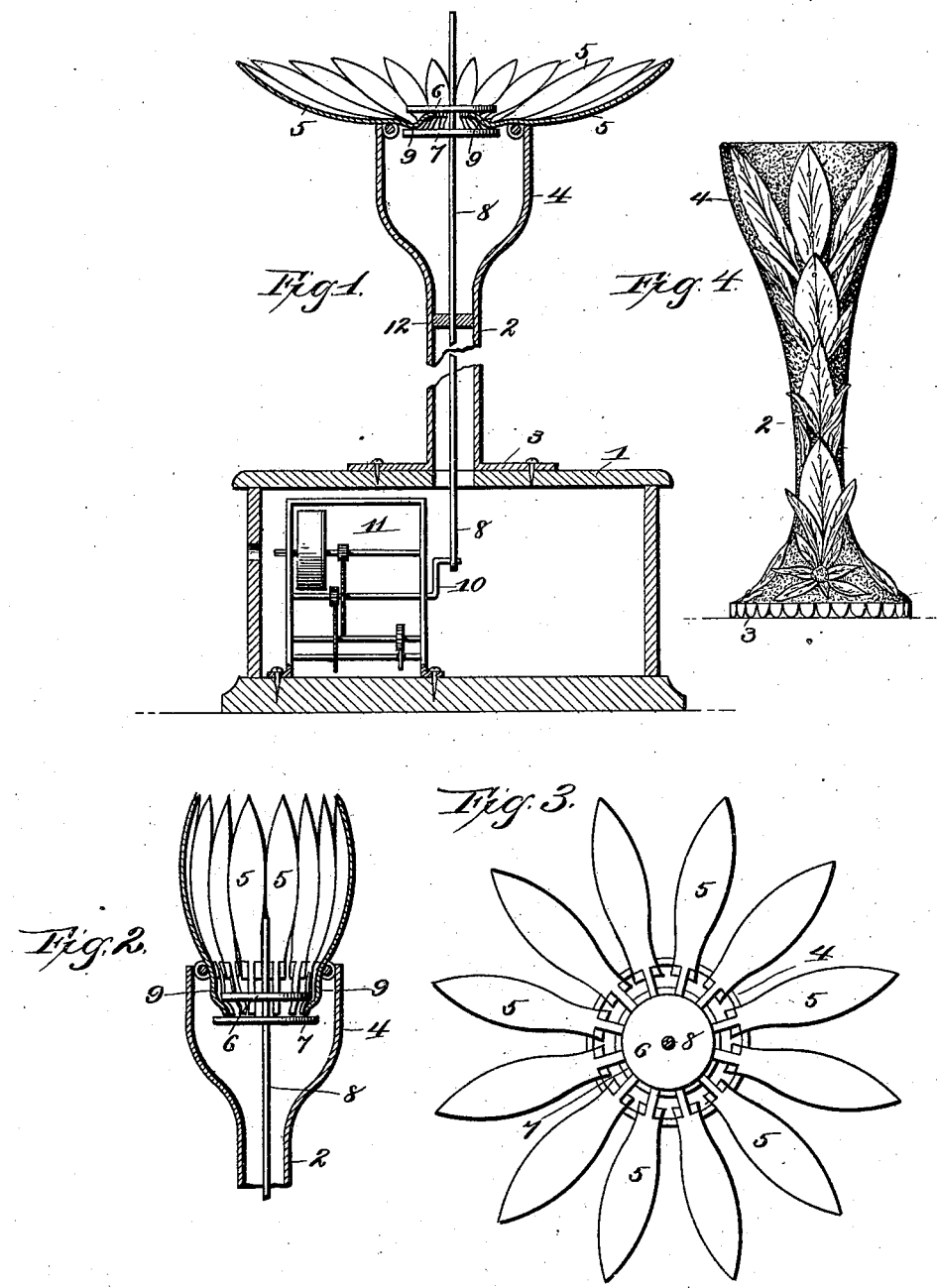
Witnesses
E. C. Wurdeman
J. A. Williamson
Inventor
John E. Wenger
By Geo. H. Holgate
his Attorney

UNITED STATES PATENT OFFICE.

JOHN E. WENGER, OF PARADISE, PENNSYLVANIA.

MECHANICAL FLOWER FOR ADVERTISING PURPOSES.

SPECIFICATION forming part of Letters Patent No. 549,039, dated October 29, 1895.

Application filed March 6, 1895. Serial No. 540,685. (No model.)

*To all whom it may concern:*

Be it known that I, JOHN E. WENGER, a citizen of the United States, residing at Paradise, in the county of Lancaster, State of Pennsylvania, have invented certain new and useful Improvements in Mechanical Flowers for Advertising Purposes, of which the following is a specification.

My invention relates to a new and useful improvement in mechanical flowers for advertising purposes, and has for its object to improve upon the construction shown and described in Letters Patent No. 530,870, granted to me on the 11th day of December, 1894.

With this end in view my present improvement consists in certain details of construction and combination of elements hereinafter set forth, and then specifically described by the claims.

In order that those skilled in the art to which this invention appertains may understand how to make and use the same, I will proceed to describe its construction and operation in detail, referring by number to the accompanying drawings, forming part of this specification, and in which—

Figure 1 is a vertical section of the base, supporting-tube, and flower, the mechanical movement being shown in elevation; Fig. 2, a section showing the flower closed; Fig. 3, a plan view of the flower with its petals distended; and Fig. 4 is a modification of the tube.

Similar numbers denote like parts in the several views of the drawings.

1 is a base or box in which is contained the mechanical mechanism, such as a clockwork, for imparting motion to the movable parts of the device, and while I have shown this base in the shape of an ordinary box it will be readily understood that it may be made to represent a flower-pot or other attractive design.

2 is a tubular support provided with a flange 3 at its bottom by which it is secured to the top of the base 1. The upper end of this tubular support is enlarged at 4, and to the peripheral edge of this enlargement are hinged the petals 5 of the flower, so that they will have a limited swinging movement through an arc of about ninety degrees, for the purpose hereinafter explained.

6 and 7 are disks secured in proximity to each other to the rod 8 near the upper end thereof, so as to form a space in which project the ends 9 of the petals 5. These ends are bent so as to form bearing-points adapted to be readily operated upon by the disks 6 and 7, as clearly shown in Figs. 1 and 2. The rod 8 extends downward into the base 1, and is pivoted to a crank 10, connected with and receiving its motion from a motor 11, or any desired construction, such as clockwork.

12 is an elongated bearing, cast with or formed in the tube 2, so as to guide the rod 8 in its up-and-down movement, but limit its lateral play.

From the foregoing description the operation of my improvement will be obviously as follows: The motor being set in motion, the crank will revolve and will impart a vertical reciprocating motion to the rod 8 and disks 6 and 7, and this vertical reciprocation of the disks will cause the petals 5 of the flower to swing in the arc before described to alternately open and close said flower in unison with the motion of the crank 10. To the end of the rod 8 may be attached any suitable ornamentation to represent the center of the flower. The petals 5 may also be embellished with ornamentation to represent any particular form of flower.

A very pretty effect is produced by placing an incandescent light at the center of the flower, whose globe may be of various colors, and which may be alternately lighted and extinguished in unison with the opening and closing of the petals.

It will be seen by my present improvement that I have greatly simplified the construction of such a device and rendered it more efficient and durable in operation, as the only weight to be carried by the motor-crank is that of the rod 8 and disks 6 and 7, which reduces the power required to operate the petals.

It will be obvious that instead of a crank a cam movement may be substituted therefor to impart the vertical reciprocation to the rod 8; also, that an electric motor may be used in place of the spring movement shown without departing from my invention.

Having thus fully described my invention, what I claim as new and useful is—

1. In an advertising device of the character described, the tube 2, having an enlargement 4 at its upper end, petals 5, pivoted to the enlarged portion of said tube, in combination with the disks 6 and 7, secured to the rod to receive the ends of the petals and means for operating said disks, as shown and described.

2. The herein described combination of the base 1, tube 2, having enlargement 4, petals 5, pivoted to said enlargement of the tube, bent ends 9, disks 6 and 7, disposed so as to form a space into which the said ends 9 project, the rod 8 and motor 11, for operating said rod, as shown and for the purpose set forth.

In testimony whereof I have hereunto affixed my signature in the presence of two subscribing witnesses.

JOHN E. WENGER.

Witnesses:
ADAM HUBERTIS,
AMOS ECHTERNACH.